(12) United States Patent
Stewart (10) Patent No.: US 11,927,709 B2
(45) Date of Patent: Mar. 12, 2024

(54) MULTI-SCALE GEOLOGICAL MODELING AND WELL INFORMATION INTEGRATION

(71) Applicant: Saudi Arabian Oil Company, Dhahran (SA)

(72) Inventor: Simon A. Stewart, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 199 days.

(21) Appl. No.: 17/165,248

(22) Filed: Feb. 2, 2021

(65) Prior Publication Data

US 2022/0244415 A1 Aug. 4, 2022

(51) Int. Cl.
| | | |
|---|---|---|
| *G01V 1/28* | (2006.01) | |
| *G01V 1/30* | (2006.01) | |
| *G06F 3/0481* | (2022.01) | |

(52) U.S. Cl.
CPC .............. *G01V 1/282* (2013.01); *G01V 1/307* (2013.01); *G06F 3/0481* (2013.01); *G01V 2210/6169* (2013.01)

(58) Field of Classification Search
CPC ........ G06F 3/048; G01V 1/282; G01V 1/307; G01V 2210/6169
See application file for complete search history.

(56) References Cited

U.S. PATENT DOCUMENTS

| | | | |
|---|---|---|---|
| 8,908,925 B2 | 12/2014 | Hurley | |
| 9,022,129 B2 | 5/2015 | Dobin et al. | |
| 9,134,457 B2 | 9/2015 | Hurley et al. | |
| 9,959,144 B2* | 5/2018 | Callegari | G06F 9/5044 |
| 11,180,975 B2* | 11/2021 | Renaudeau | E21B 41/00 |
| 2003/0018437 A1* | 1/2003 | Stark | G01V 1/30 702/14 |
| 2004/0138818 A1* | 7/2004 | Shray | G01V 11/00 702/6 |
| 2011/0098996 A1 | 4/2011 | Nichols et al. | |
| 2013/0226968 A1* | 8/2013 | Wagner | G01V 1/30 707/776 |

OTHER PUBLICATIONS

PCT International Search Report and Written Opinion in International Appln. No. PCT/US2022/014892, dated May 12, 2022, 17 pages.

(Continued)

*Primary Examiner* — Elias Desta
(74) *Attorney, Agent, or Firm* — Fish & Richardson P.C.

(57) ABSTRACT

Embodiments herein relate to a computer-implemented technique that includes generating, in a first portion of a graphical user interface (GUI), a first graphical element related to reflection seismic data of an area of interest. The technique further includes generating, in a second portion of the GUI, a second graphical element related to well structural data of the area of interest. The technique further includes generating, in a third portion of the GUI, a third graphical element that is based on the reflection seismic data and the well structural data. In embodiments, an alteration of the first graphical element or the second graphical element results in a concurrent alteration of the third graphical element. Other embodiments may be described or claimed.

20 Claims, 5 Drawing Sheets

(56) References Cited

OTHER PUBLICATIONS

Basile et al., "TrackDip: A multi-scale processing of dipmeter data—Method, tests, and field example for 3-D description of gravity-driven deformations in the Eocene foreland basin of Ainsa, Spain," Marine & Petroleum Geology, 2009, 26:738-751.
Coursehero.com [online], "Automatic Dip Computation with FMI data," available on or before 2021, retrieved on Mar. 11, 2021, retrieved from URL <https://www.coursehero.com/file/p2gvqajt/Automatic-Dip-Computation-with-FMI-Data-In-Techlog-automatic-dip-computation-is/>, 22 pages.
Saika et al., "3D A proposed methodology of 3D geomodelling while geosteering for optimum horizontal well placement and enhanced geological risk management," Indian Journal of Marine Geosciences, 2018, 47(4):826-830.
Schlumberger, "Techlog Help pages: Processing for dip variables," 2018, 3 pages.
Stewart et al., "Generalization and multiscale structure of subsurface structural maps," Interpretation, 2018, 6:T1045-T1054.
Stewart et al., "Scale dependence of strike and dip in sedimentary basins: Implications for field measurements and integrating subsurface datasets," Journal of Structural Geology, 2020, 131, 21 pages.

\* cited by examiner

MULTI-SCALE GEOLOGICAL MODELING AND WELL INFORMATION INTEGRATION

TECHNICAL FIELD

The present disclosure applies to multi-scale geological modeling applied to the integration of geological map and drilled well data.

BACKGROUND

Reflection seismic data may be used for imaging subsurface geology in applications such as hydrocarbon production, aquifer management, or sequestration projects. Interpretations of this data may be transformed into depth maps via depth conversion procedures that include correcting depth and orientation to the ground-truth provided by drilled wells (e.g., well structural data). However, because drilled wells are often widely spaced (e.g., on the order of several kilometers apart), mapped geological structures in between the wells often rely on depth conversion techniques that are subject to errors that may distort the actual structure of the mapped structures. The penalty of between-well structural distortion may include incorrect volume estimate of subsurface hydrocarbon resource or greenhouse gas storage potential. In certain structural configurations such as low-relief closures, this error may range up to one hundred percent of mapped volume.

SUMMARY

The present disclosure describes techniques that may be used for multi-scale geological modeling of depth-converted maps derived from three-dimensional (3D) reflection seismic data, and structural information from wells. Specifically, embodiments herein relate to a computer-implemented technique that includes generating, in a first portion of a graphical user interface (GUI), a first graphical element related to reflection seismic data of an area of interest. The technique further includes generating, in a second portion of the GUI, a second graphical element related to well structural data of the area of interest. The technique further includes generating, in a third portion of the GUI, a third graphical element that is based on the reflection seismic data and the well structural data. In embodiments, an alteration of the first graphical element or the second graphical element results in a concurrent alteration of the third graphical element.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification may be implemented in particular implementations to realize one or more of the following advantages. One advantage is that embodiments allow for variation of generalization parameters of subsurface data, and therefore the ability to identify an active "search" of scale space for the most appropriate length-scale of information from reflection seismic data and well structural data. Secondly, embodiments allow for the combination of outputs of the reflection seismic data and well structural data into a single model that is concurrently updated based on updates to one or both of the reflection seismic data and the well structural data. As a result, the combined model may allow for better integration of the reflection seismic data and well structural data, which may unlock better project economics for hydrocarbon resources and subsurface storage. Embodiments herein also provide improvements over legacy map and well data manipulation tools.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for multi-scale geological modeling applied to map and well information to effectively combine the two. Various modifications, alterations, and permutations of the disclosed implementations may be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Embodiments herein relate to the concurrent display of various interpretations or models related to the seismic mapping and well data, such that one of the models or interpretations may be modified and a user may see how such a modification concurrently alters the integrated map and well realization. As used herein, "concurrent" may be considered a synonym to "real-time" or "simultaneous," and the terms are used interchangeably. It will, however, be understood that in various real-world embodiments it may take a system a finite amount of processing time to update data or displays as a result of modification of data, and so as used herein the concept of "concurrent" is used to indicate a time-frame in which two events happen close together with the assumption that that finite lag may occur due to the capabilities of the processor of the electronic system. In some embodiments, the lag may be on the order of less than or equal to approximately 1 second and may be, for example 1 second, 0.5 seconds, or on the order of a few milliseconds to tens of milliseconds. However, it will be understood that these timeline are intended as examples and, in other embodiments, the lag may be greater or smaller than described.

As used herein, the term "multi-scale" refers to the presence of several, superimposed structural length scales of subsurface geologic structures that are being mapped, modeled, or logged in drilled wells. For example, the structure of a given geological layer may have a variety of superimposed relatively short, medium, and long wavelength structural phenomena (e.g., tectonic folds). Structures at different length scales may have different curvature and orientation characteristics. In some cases, these length-scale dependent characteristics only become apparent when the information has been decomposed into scale-dependent components in the course of a multi-scale analysis. This decomposition process is also known as "generalization".

As noted above, having accurate maps or models may be considered vital for oil and gas exploration activities, and broader subsurface management projects such as freshwater aquifer management and greenhouse gas storage. For example, maps may be used for estimating hydrocarbon resources and gas storage potential in the subsurface. Additionally, maps may be used as inputs for making drilling decisions (e.g., deciding where to place a well).

Often, maps are numerical grids that are produced from geological and geophysical data, specifically well formation depths or reflection seismic data. The reflection seismic data is initially acquired in the time domain. Interpretations of this data are then transformed into depth maps via depth conversion procedure that may rely on velocity models. The velocity models may be guided by information derived from seismic processing and, where available, drilled wells. In between well control locations, velocity models may be non-unique, and finalized maps may include distortions of actual subsurface structure that are only revealed when new wells are drilled. These distortions may give incorrect estimates of resource potential that, in turn, may cause revisions to production or injection project when the errors are identified by later wells, at which point significant resources may have already been over- or under-committed to the project.

Embodiments herein relate to one technique by which the multi-scale nature of the data may be addressed. Specifically, embodiments relate to a computer-based tool wherein a user may simultaneously apply generalization filters to the reflection seismic data and the well structural data, which are displayed concurrently in the GUI of a display. A third portion of the GUI may display a combined model that combines the reflection seismic data and the well structural data, and the combined model is updated concurrently with changes to one or both of the seismic data or the well structural data. As such, a user may make adjustments in real-time until the resultant combined model meets an objective integration criterion (e.g., a pre-defined parameter related to integration), a subjective criterion (e.g., a judgment of the user), or both (or some other criterion). The ability to select specific length-scale information from both domains simultaneously (e.g., the reflection seismic data and the well structural data), and visually choose a preferred product, may overcome the multi-scale barriers to integrating seismic maps and wells, and unlock better project economics for hydrocarbon resources and subsurface storage. This technique may facilitate a match of the geological map derived from seismic to the actual geological layer seen in the drilled well, in terms of the depth of the geological layer in the well, and also the orientation of the geological layer in the well, as constrained for example by dipmeter or image log.

Embodiments herein may include three computer-based elements. In some embodiments, each of the elements may operate in real-time such that an update to the data on which the models are based may result in real-time changes to the displayed integrated map and well model in the GUI. Additionally, in some embodiments, the combined effects of the various models or data sets may be simultaneously viewed in a single GUI, rather than separated as the subject of separate procedures. With this functionality enabled, the barrier to extracting relevant scale-dependent information may be removed, and the integrated product (e.g., the combined model based on the seismic data and the well structural data) may be relied upon.

Figure 1:
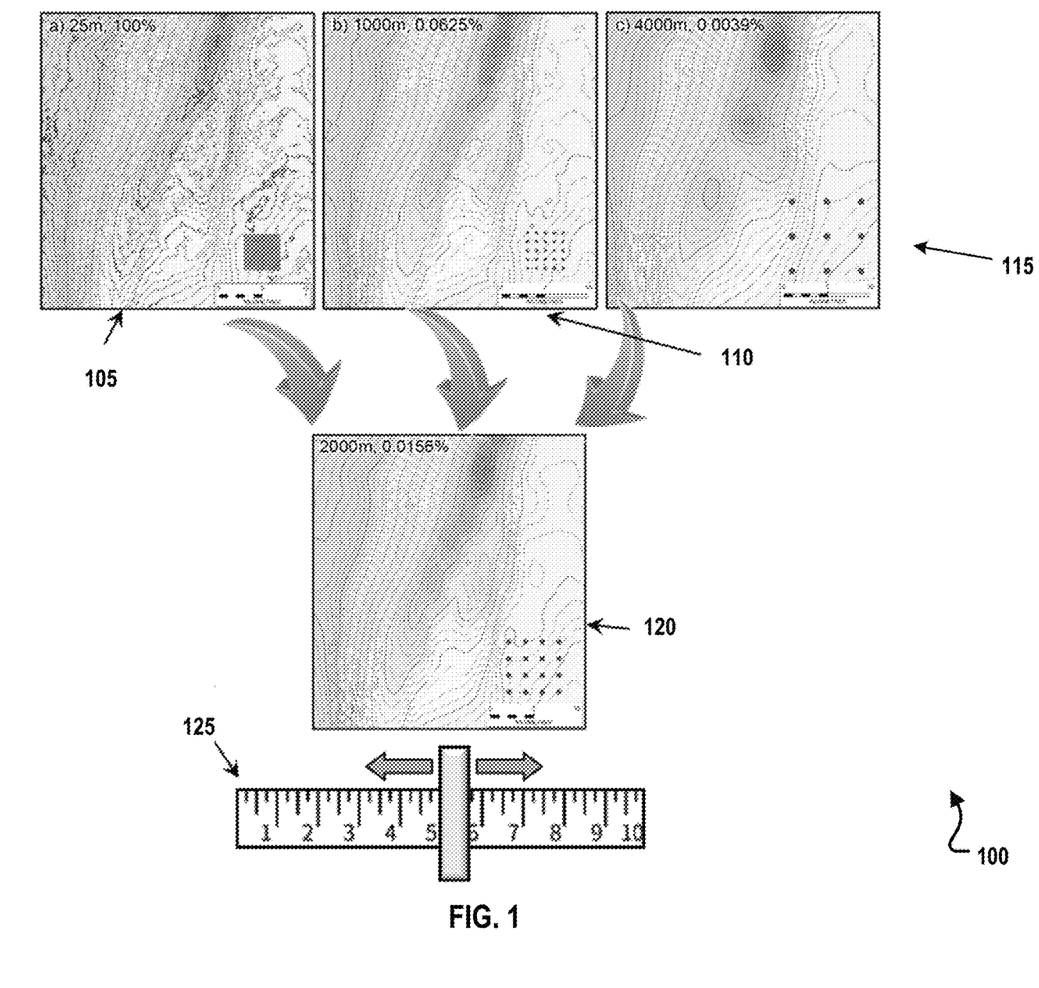
FIG. 1 depicts an example of resampling generalization of a map that is based on 3D reflection seismic data, in accordance with various embodiments.

FIG. 1 depicts an example of resampling generalization of a map that is based on 3D reflection seismic data, in accordance with various embodiments. Specifically, modern subsurface maps may be based on three-dimensional (3D) reflection seismic data, which may be inherently multi-scale as described above. The length-scale elements of the data may be noise from various sources, or various geological structures that result from different geological processes.

Specifically, FIG. 1 depicts models of a given geological layer in the area of interest showing reflection seismic data with different length-scale parameters. As used herein, the "area of interest" refers to a specific area in which the most accurate possible subsurface map is desired. Generally, the area of interest may be an area in which a new well is considered or planned, and therefore subsurface maps of the area are desired. However, in other embodiments, the models described herein with respect to FIGS. 1 and 2 may not be used for a well, but rather may be used for another application (e.g., storage or aquifer management). Specifically, the example depicts an unfiltered "raw" model of the reflection seismic data at 105. The model at 105 includes data taken at 25 meter (m) intervals, and depicts 100% of the data points of the reflection seismic data. By contrast, the models at 110 and 115 depict "decimated" versions of the reflection seismic data depicted at 105. Specifically, the model at 110 depicts the data using a length-scale parameter corresponding to a 1000 m grid extracted from the original dataset, which includes approximately 0.0625% of the dataset. Similarly, the model at 115 depicts the data using a length-scale parameter corresponding to a 4000 m grid extracted from the original dataset, which includes approximately 0.0039% of the dataset.

As may be seen based on the models at 105, 110, and 115, from a workflow perspective, the relevant information in the form of geological structures at a commercially-significant length-scale may be seen in a relatively small subset of the original data (e.g., in the models at 110 or 115). Additionally, generalizing from the model at 105 to the model at 110 or 115 may primarily remove "noise" which may be present in the original dataset as shown in the model at 105. In embodiments, generalizing from the dataset used in the model at 105 to the models at 110 or 115 may be performed based on a "resampling" technique, a "smoothing" technique, some combination of those two techniques, or some other technique as may be apparent to one of skill in the art.

Altering the dataset in legacy embodiments to go from a model such as that shown at 105 to a model such as that shown at 115 may require a user to manually set different scale parameters, and then run a resampling or smoothing module in a piece of software to adjust the model. If the revised model was not what the user had desired, then the user would have to iterate the process, which could be time consuming. One such example of such a model may be that seen at 120, wherein the model depicts the data using a length-scale parameter corresponding to a 2000 m grid extracted from the original dataset, and includes approximately 0.0156% of the original dataset of the reflection seismic data. Each of the examples shown in FIGS. 1 (110, 115 and 120) could be produced in this way from the original, raw dataset 105.

In embodiments herein, a user-interactive element such as slider 125 may be used to adjust the length-scale parameters of the model in a semi-automatic manner. Specifically, as the user interacts with the slider 125, the length-scale parameters (e.g., the resampled grid from which the map has been constructed) would change. More specifically, the model at 120 may update concurrently with the change in the slider 125, rather than requiring the user to reset the scale parameters and manually iterate the resampling or smoothing process. In some embodiments, the slider 125 may be considered a length-scale related to a depth map derived from the reflection seismic data. In this way, the user may change the slider 125 to set the length-scale parameter and iterate between, for example, the various length-scale parameters of the models shown at 105, 110, 115, and 120 to find the length-scale that the user deems acceptable for the dataset. It will be understood that although the user-interactive element is depicted as a slider in this embodiment, in other embodiments the user-interactive element may be a different type of element such as a knob, a dial, a drop-down menu, etc.

As noted above, the user's sense of an "acceptable" length-scale may be based on an objective metric such as a pre-defined metric. Such a metric may be based on, for example, curvature attributes (maximum, mean or Gaussian), "natural" scales, contour tortuosity factor (a parameter relating raw to generalized contour length on the map), or a given length-scale in a low-pass filter such as Fast Fourier Transform). Additionally or alternatively, an "acceptable" length-scale may be based on a subjective metric that may be informed by the user's experience. For example, the user may recognize, based on their experience working with the various models, whether the model provides the appropriate information for a given application. In some embodiments, the concept of an "acceptable" length-scale may be different for different applications. For example, one objective or subjective metric may be used for an application such as aquifer management, while another objective or subjective metric may be used for an application such as well placement in a hydrocarbon production project.

Figure 2:
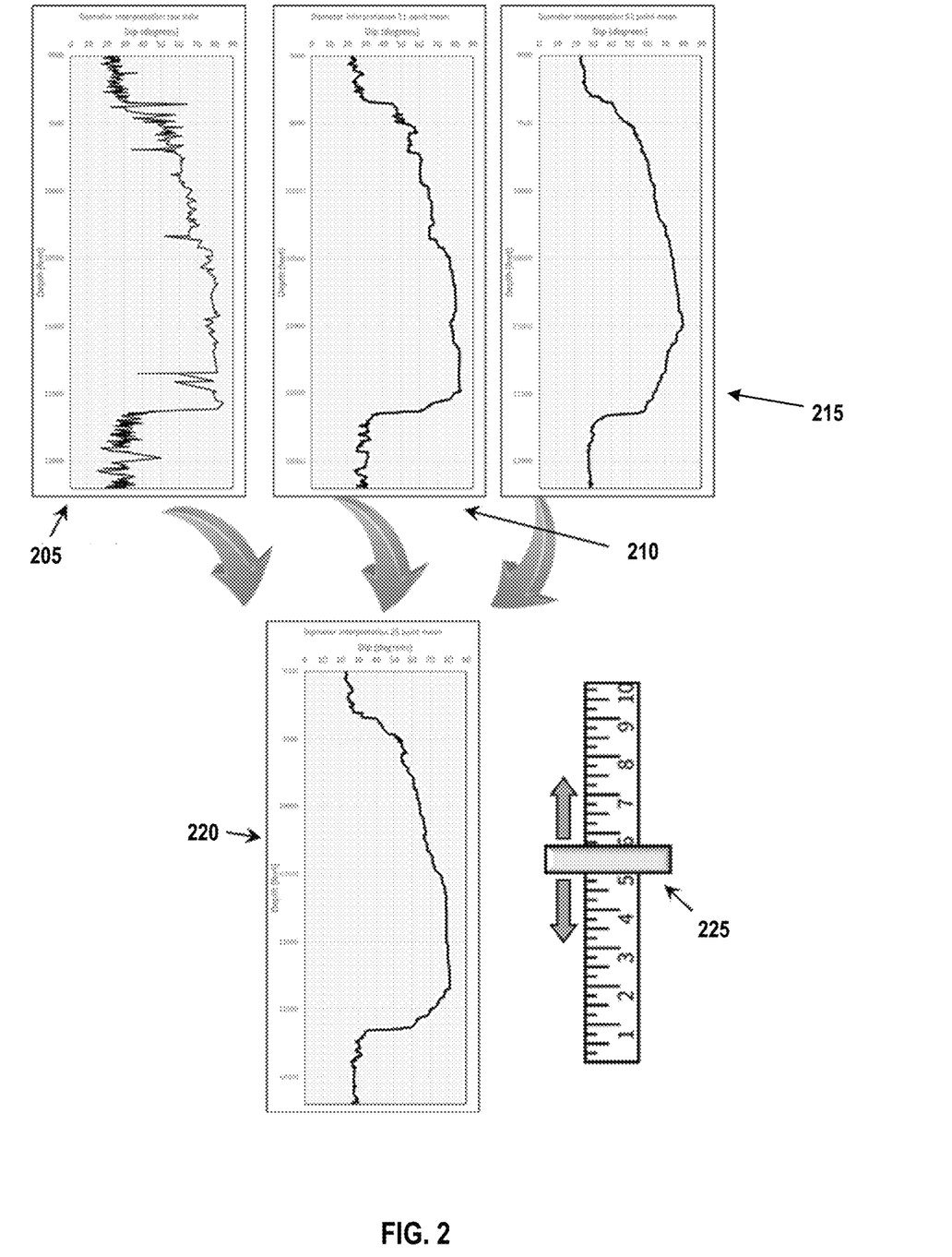
FIG. 2 depicts an example of generalization of well structural data, in accordance with various embodiments.

FIG. 2 depicts an example of well structural data generalization, in accordance with various embodiments. Generally, structural information related to wells may be collected in the form of electric logs that "image" the wellbore using resistivity or some other physical phenomena. These borehole images may be reconstructed in software that may allow for the structural orientation of the wellbore to be determined. Structural orientation data may be generated from the logged images, and the orientation-versus-depth datasets may be considered analogous to the depth-versus-location datasets that from the basis of seismic reflection depth models (such as those depicted in FIG. 1).

Similarly to the models of the reflection seismic data of FIG. 1, the models of the well structural data may include noise and structure at multiple scales. Specifically, FIG. 2 depicts example models showing the well structural data at different scales. Similarly to element 105, the example at 205 may be considered a model of the "raw" well structural data that relates to a well within an area of interest (e.g., the area of interest of FIG. 1). The "Y" axis represents the depth of the well (in feet, although other embodiments may represent depth based on different measurement units), and the "X" axis represents the degree of dip (i.e., the maximum angle between geological layering and horizontal). The example models at 210 and 215 are examples of models that are based on different length-scale parameters. For example, the model at 210 is an interpretation of the well structural data smoothed using an 11 point mean, and the model at 215 is an interpretation of the well structural data smoothed using a 51 point mean. As used herein, an "11 point mean" or a "51 point mean" refers to the number of points included in a smoothing filter. When deriving mean orientations of geological layers in wells as measured by dip and azimuth, it may be desirable to treat the structural orientation data as vectors and employ an appropriate method.

Similarly to the reflection seismic data of FIG. 1, the length-scale change of the raw data from element 205 to the models shown at 210 or 215 may be accomplished through smoothing or resampling of the geological layer orientation parameter used by the model of the well structural data. In legacy embodiments, this scale change may be accomplished through an operator manually inputting the change and then running a procedure to determine whether the resultant output of the well structural data is appropriate for the application for which the model will be used. This procedure may be iterative and time consuming. For example, the user may desire the graph as shown in the example at 220 with a 25 point mean. However, the user may not be aware (without potentially time consuming trial and error due to the need to manually input the change and re-run the procedure) that the 25 point mean provides the desired model.

In embodiments herein, a user-interactive element such as slider 225 (or some other type of user-interactive element) may be used to manually adjust the scale parameters of the model. Specifically, as the user interacts with the slider 225, the length-scale parameters may change. More specifically, the model at 220 may update concurrently with the change in the slider 225, rather than requiring a user to reset the length-scale parameters and manually iterate the resampling or smoothing process. In this way, the user may be able to change the slider 225 to set the length-scale parameter and iterate between, for example, the various scale parameters of the models shown at 205, 210, 215, and 220 to find the length-scale that the user deems acceptable for the dataset. As noted above, the user's sense of an "acceptable" length-scale may be based on one or both of an objective metric or a subjective metric.

Figure 3:
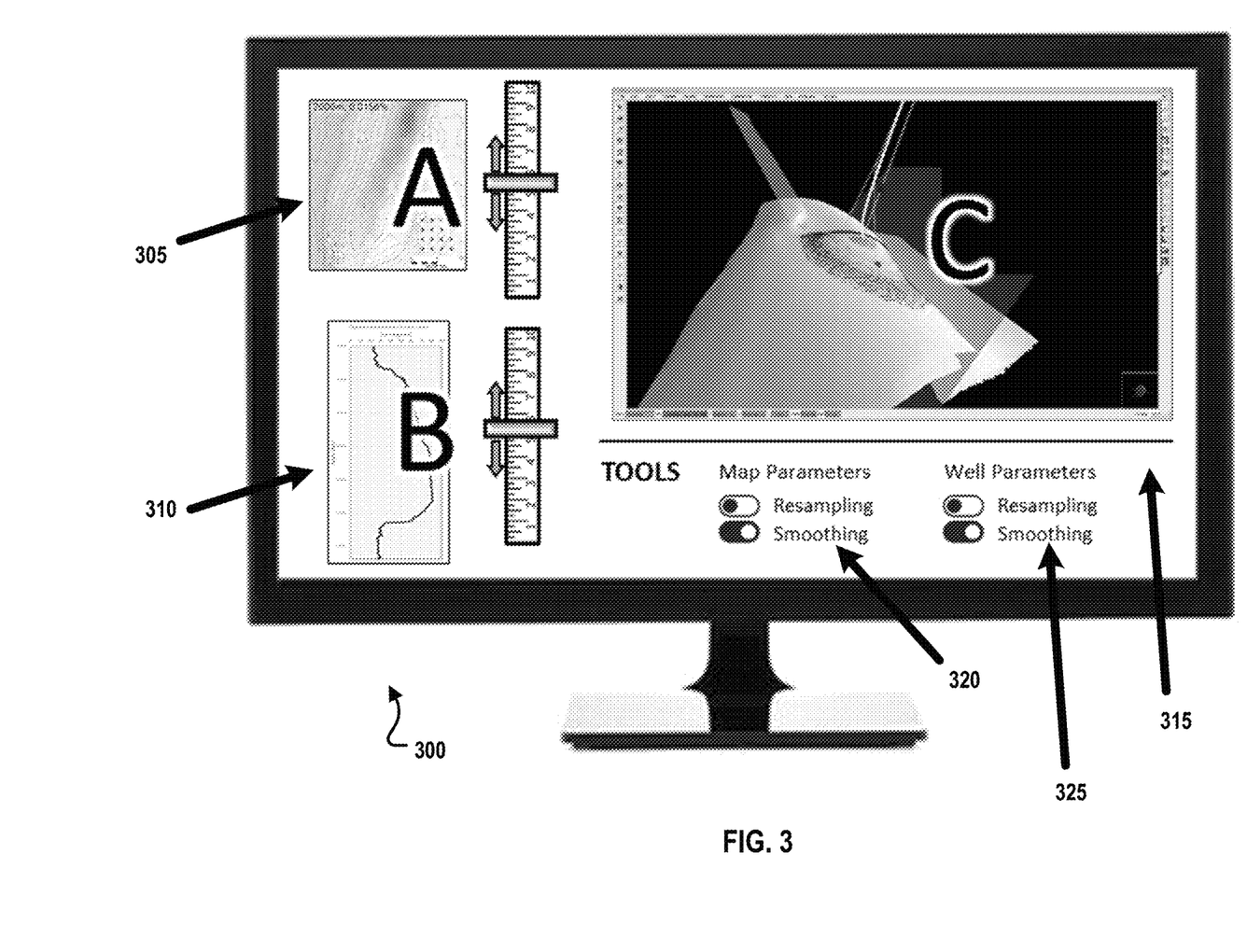
FIG. 3 depicts an example of a graphical user interface (GUI) that includes reflection seismic data, well structural data, and a combined model, in accordance with various embodiments.

FIG. 3 depicts an example of a GUI 300 that includes reflection seismic data, well structural data, and a combined model, in accordance with various embodiments. Specifically, the GUI 300 may include a first portion 305 that may include information related to the reflection seismic data. Specifically, the first portion 305 may include a graphical depiction of the model that is based on the reflection seismic data (e.g., the models depicted at 105, 110, 115, and 120). The first portion 305 may further include a user-interactive element such as the slider 125 (or some other user-interactive element, as described above) as shown in FIG. 1.

The GUI 300 may further include a second portion 310 that may include information related to the well structural data. Specifically, the second portion 310 may include a graphical depiction of the model that is based on the well structural data (e.g., the models depicts at 205, 210, 215, and 220). The second portion 310 may further include a user-interactive element such as the slider 225 (or some other user-interactive element, as described above) as shown in FIG. 2.

The GUI 300 may further include a third portion 315 that may include a combined model that is based on both the reflection seismic data and the well structural data. In embodiments, the combined model may be concurrently affected by a change to the user-interactive element in the first or second portions 305/310 of the GUI. That is, a change to one or both of the depth map derived from reflection seismic data and the well structural data, by the user using the user-interactive element, may cause a concurrent change to the combined model at 315. In this way, a user may further base an identification of appropriate scale for one or both of the reflection seismic data and the well structural data based on an objective or subjective metric related to the combined model at 315.

More specifically, integration of the depth map related to the reflection seismic data (e.g., as described with respect to FIG. 1) and the well structural information (e.g., as described with respect to FIG. 2) may be based on at least one or both of the following aspects. First, the structural information from the well maybe more heavily weighted in the combined model at the location of the well itself. This precedence or increased weighting may be because the well structural information may be considered the "ground-truth" at the location of the well in which the well structural data was generated. Based on this, the depth map data may be modified to fit the orientation information of the well structural data (as opposed to, for example, adapting the well structural data to fit the depth map data).

Additionally, the combined model may be further based on the area of influence around the wellbore of the well in which the well structural data is generated. In other words, how far away from the well should the depth surface (based on the well structural data or the depth map, or both) be modified. The area of influence of wellbore depth and orientation on the depth map may be a radially symmetrical area selected by the user based on the user's skill or by visual consideration of the integrated structure as depicted at 315. This area of influence parameter may be further specified, at the user's discretion, to be asymmetrical, that is, to have the form of an ellipse, requiring specification of semiaxis length and orientation. Further adjustments of the area of influence could include the area being specified in such a way that the well location is off-center with respect to the circle or ellipse of influence. Further specification could include choice of how the degree of modification of map depth and orientation varies with distance from the wellbore to the limit of the area of influence. It could be chosen to be linear or weighted in some way, according to the user's judgment.

In some embodiments, the GUI 300 may further include various tools such as those shown at 320 and 325. Although not shown, in other embodiments the GUI 300 may include additional tools, buttons, sliders, etc. that may perform other factors such as, for example, selecting the size, shape, or location of the area of influence as described above. For example, the tool depicted at 320 may include buttons by which a user may select whether alteration of the user-interactive element in the first portion 305 of the GUI 300 includes one or both of resampling or smoothing of the seismic reflection data. Similarly, the tool depicted at 325 may include buttons by which a user may select whether alteration of the user-interactive element in the second portion 310 of the GUI 300 includes one or both of resampling or smoothing of the well structural data.

It will be understood that the configuration of the GUI 300 of FIG. 3 is intended as an example configuration for the sake of discussion of embodiments herein. Other embodiments may have more or fewer GUI portions; portions of different sizes, shapes, or orientations; more or fewer tools than depicted; different types of tools; etc. For example, the smoothing options could further include drop-down menus or alternative methods of providing the user with choice of which smoothing method to employ.

Figure 4:
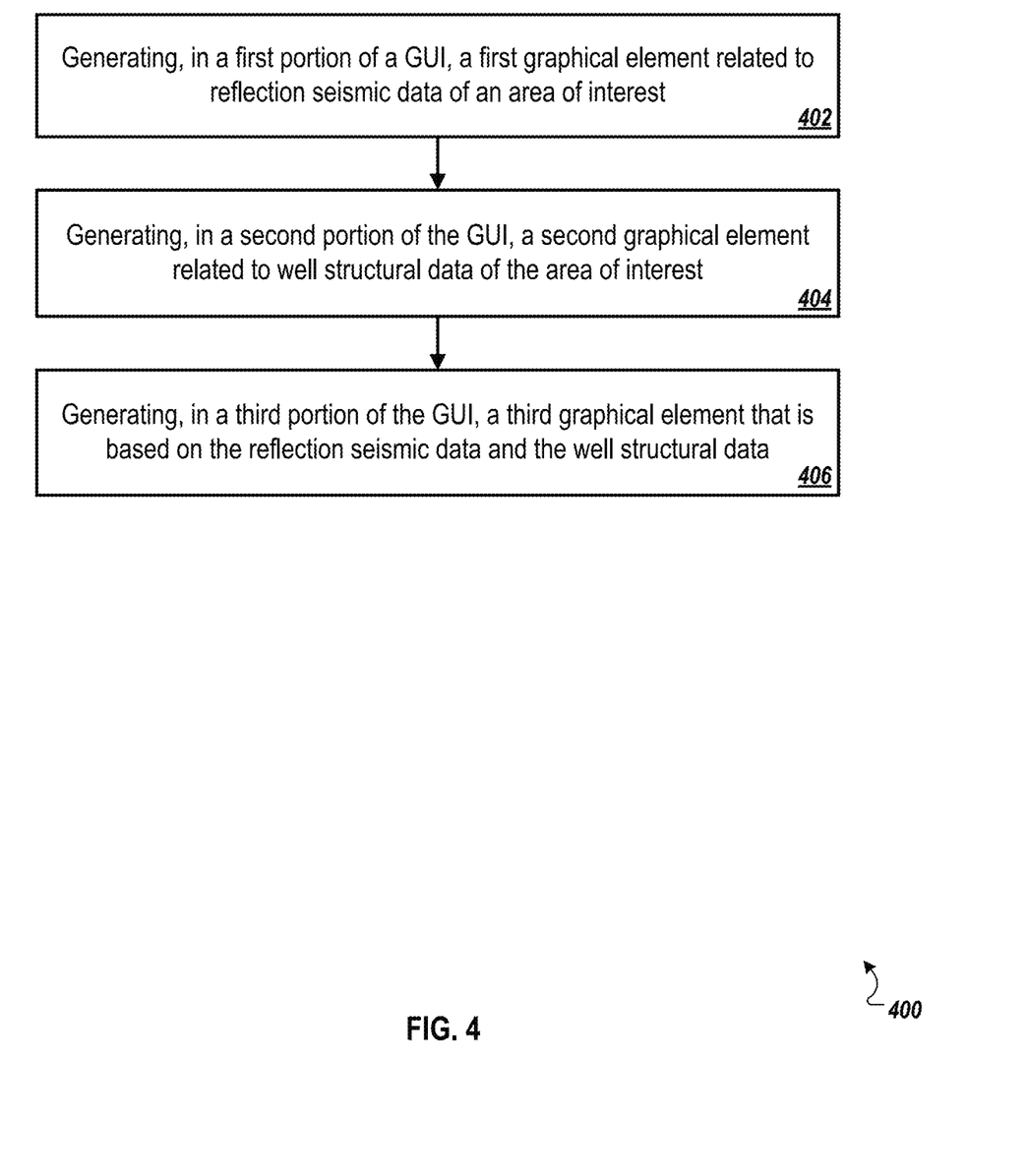
FIG. 4 depicts an example technique for generating a combined model based on reflection seismic data and well structural data, in accordance with various embodiments.

FIG. 4 depicts an example technique for generating a combined model based on reflection seismic data and well structural data, in accordance with various embodiments. For clarity of presentation, the description that follows generally describes technique 400 in the context of the other figures in this description. However, it will be understood that technique 400 can be performed, for example, by any suitable system, environment, software, and hardware, or a combination of systems, environments, software, and hardware, as appropriate. In some implementations, various steps of technique 400 can be run in parallel, in combination, in loops, or in any order.

The technique 400 includes generating, at 402 in a first portion of a GUI (e.g., portion 305 of GUI 300), a first graphical element related to reflection seismic data of an area of interest (e.g., a model such as the models 105, 110, 115, or 120 of FIG. 1). The technique 400 further includes generating, at 404 in a second portion of the GUI (e.g., portion 310 of GUI 300), a second graphical element related to well structural data of the area of interest (e.g., a model such as models 205, 210, 215, or 220 of FIG. 2). The technique 400 further includes generating, at 406 in a third portion of the GUI (e.g., portion 315 of GUI 300), a third graphical element that is based on reflection seismic data and the well structural data (e.g., the combined model as depicted in FIG. 3). As previously described, alteration of the first graphical element or the second graphical element (e.g., through the user-interactive element such as the sliders depicted at 305 or 310) may result in a concurrent alteration of the third graphical element.

Figure 5:
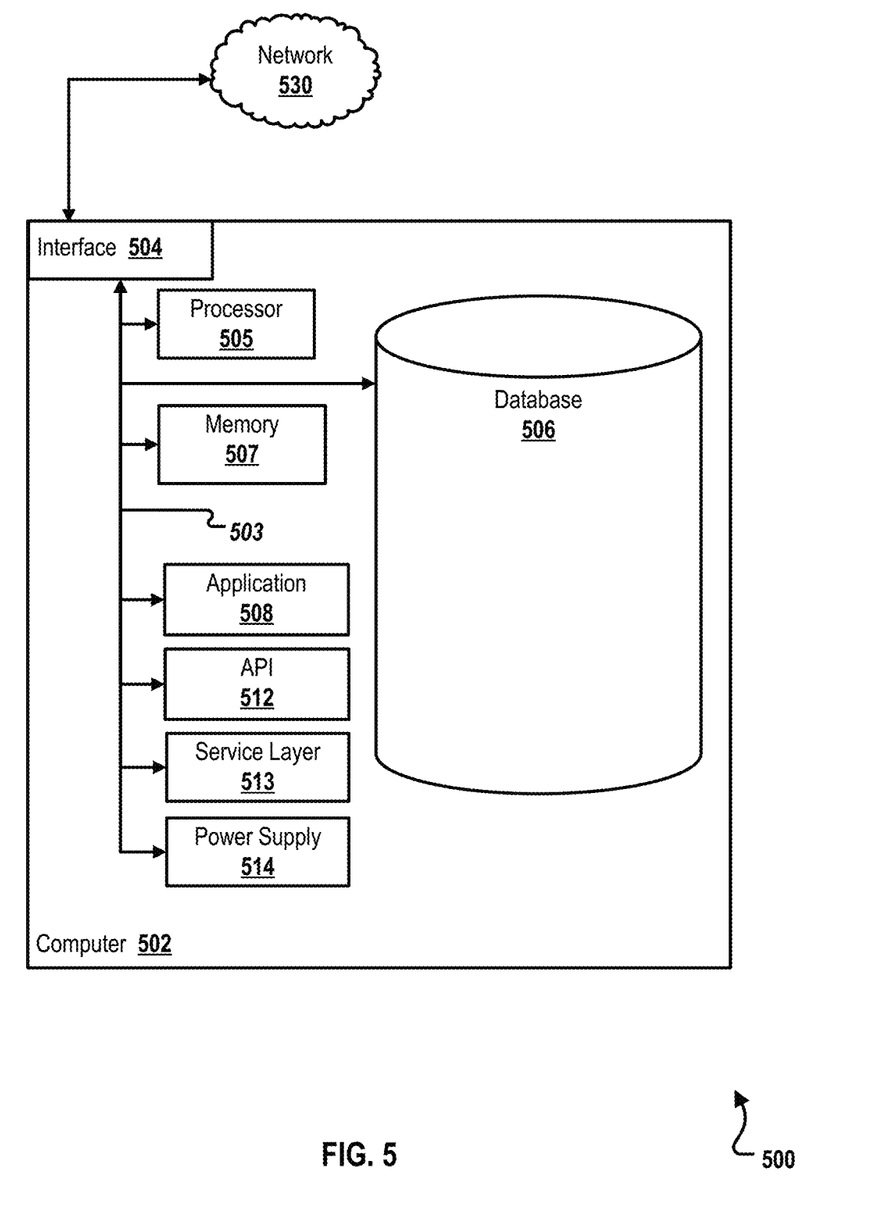
FIG. 5 is a block diagram illustrating an example computer system used to provide computational functionalities associated with described algorithms, methods, functions, processes, flows, and procedures as described in the present disclosure, according to some implementations of the present disclosure.

FIG. 5 is a block diagram of an example computer system 500 used to provide computational functionalities associated with described algorithms, methods, functions, processes, flows, and procedures described in the present disclosure, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. In addition, the computer 502 can include output devices that can convey information associated with the operation of the computer 502. The information can include digital data, visual data, audio information, or a combination of information. The information can be presented in a GUI.

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a top level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both) over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure. Such operations may include, for example, technique 400.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Described implementations of the subject matter can include one or more features, alone or in combination. For example, a first implementation includes a method comprising: generating, in a first portion of a graphical user interface (GUI), a first graphical element related to reflection seismic data of an area of interest; generating, in a second portion of the GUI, a second graphical element related to well structural data of the area of interest; and generating, in a third portion of the GUI, a third graphical element that is based on the reflection seismic data and the well structural data; wherein an alteration of the first graphical element or the second graphical element results in a concurrent alteration of the third graphical element.

The foregoing and other described implementations can each, optionally, include one or more of the following features:

A first feature, combinable with any of the following features, wherein the first graphical element is related to a depth map that is derived from the reflection seismic data.

A second feature, combinable with any of the following or previous features, wherein the third graphical element is based on a comparison of a structural depth or orientation of the depth map and a geological layer of the well structural data.

A third feature, combinable with any of the following or previous features, wherein the well structural data is based on a resistivity measurement of a wellbore in the area of interest.

A fourth feature, combinable with any of the following or previous features, wherein the well structural data is based on resistivity measurements of a plurality of wellbores in the area of interest.

A fifth feature, combinable with any of the following or previous features, wherein the first portion of the GUI includes a user-interactive element to adjust a parameter related to the reflection seismic data.

A sixth feature, combinable with any of the following or previous features, wherein the parameter is a length-scale of a depth map that is based on the reflection seismic data.

A seventh feature, combinable with any of the following or previous features, wherein alteration of the parameter causes the alteration of the first graphical element.

An eighth feature, combinable with any of the following or previous features, wherein the user-interactive element is a slider.

A ninth feature, combinable with any of the following or previous features, wherein the second portion of the GUI includes a user-interactive element to adjust a parameter of the well structural data.

A tenth feature, combinable with any of the following or previous features, wherein the parameter relates to a length-scale of the well structural data.

An eleventh feature, combinable with any of the following or previous features, wherein alteration of the parameter causes the alteration of the second graphical element.

A twelfth feature, combinable with any of the following or previous features, wherein the user-interactive element is a slider.

Another implementation includes one or more non-transitory computer-readable media comprising instructions that, upon execution of the instructions by one or more processors of an electronic device, cause the electronic device to: generate, in a first portion of a graphical user interface (GUI) that is to be output to a display that is communicatively coupled with the electronic device, a first graphical element related to reflection seismic data of an area of interest; generate, in a second portion of the GUI, a second graphical element related to well structural data of the area of interest; and generate, in a third portion of the GUI, a third graphical element that is based on reflection seismic data and the well structural data; wherein an alteration of the first graphical element or the second graphical element results in a concurrent alteration of the third graphical element.

The foregoing and other described implementations can each, optionally, include one or more of the following features:

A first feature, combinable with any of the following features, wherein the first graphical element is related to a depth map that is derived from the reflection seismic data.

A second feature, combinable with any of the following features, wherein the third graphical element is based on a comparison of a structural depth or orientation of the depth map and a geological layer of the well structural data.

A third feature, combinable with any of the following features, wherein the well structural data is based on a resistivity measurement of a wellbore in the area of interest.

A fourth feature, combinable with any of the following features, wherein the well structural data is based on resistivity measurements of a plurality of wellbores in the area of interest.

A fifth feature, combinable with any of the following features, wherein the instructions are further to generate, in the first portion of the GUI, a user-interactive element to adjust a parameter of a depth map that is based on the reflection seismic data.

A sixth feature, combinable with any of the following features, wherein the parameter is a length-scale of the depth map.

A seventh feature, combinable with any of the following features, wherein alteration of the parameter causes the alteration of the first graphical element.

An eighth feature, combinable with any of the following features, wherein the user-interactive element is a slider.

A ninth feature, combinable with any of the following features, wherein the instructions are further to generate, in the second portion of the GUI, a user-interactive element to adjust a parameter of the well structural data.

A tenth feature, combinable with any of the following features, wherein the parameter is a length-scale of the well structural data.

An eleventh feature, combinable with any of the following features, wherein alteration of the parameter causes the alteration of the second graphical element.

A twelfth feature, combinable with any of the following features, wherein the user-interactive element is a slider.

Another implementation may include an electronic device comprising: one or more processors; a display communicatively coupled with the one or more processors; and one or more non-transitory computer-readable media comprising instructions that, upon execution of the instructions by the one or more processors, cause the electronic device to: generate, in a first portion of a graphical user interface (GUI) that is to be output to the display, a first graphical element related to reflection seismic data of an area of interest;

generate, in a second portion of the GUI, a second graphical element related to well structural data of the area of interest; and generate, in a third portion of the GUI, a third graphical element that is based on reflection seismic data and the well structural data; wherein an alteration of the first graphical element or the second graphical element results in a concurrent alteration of the third graphical element.

The foregoing and other described implementations can each, optionally, include one or more of the following features:

A first feature, combinable with any of the following features, wherein the first graphical element is related to a depth map that is derived from the reflection seismic data.

A second feature, combinable with any of the previous or following features, wherein the third graphical element is based on a comparison of a structural depth or orientation of the depth map and a geological layer of the well structural data.

A third feature, combinable with any of the previous or following features, wherein the well structural data is based on a resistivity measurement of a wellbore in the area of interest.

A fourth feature, combinable with any of the previous or following features, wherein the well structural data is based on resistivity measurements of a plurality of wellbores in the area of interest.

A fifth feature, combinable with any of the previous or following features, wherein the instructions are further to generate, in the first portion of the GUI, a user-interactive element to adjust a parameter of a depth map that is based on the reflection seismic data.

A sixth feature, combinable with any of the previous or following features, wherein the parameter is a length-scale of the depth map.

A seventh feature, combinable with any of the previous or following features, wherein alteration of the parameter causes the alteration of the first graphical element.

An eighth feature, combinable with any of the previous or following features, wherein the user-interactive element is a slider.

A ninth feature, combinable with any of the previous or following features, wherein the instructions are further to generate, in the second portion of the GUI, a user-interactive element to adjust a parameter of the well structural data.

A tenth feature, combinable with any of the previous or following features, wherein the parameter is a length-scale of the well structural data.

An eleventh feature, combinable with any of the previous or following features, wherein alteration of the parameter causes the alteration of the second graphical element.

A twelfth feature, combinable with any of the previous or following features, wherein the user-interactive element is a slider.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY.

The memory can store various objects or data, including caches, classes, frameworks, applications, modules, backup data, jobs, web pages, web page templates, data structures, database tables, repositories, and dynamic information. Types of objects and data stored in-memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. The display device may display, for example, GUI 300. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touch-screen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "GUI" can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A method comprising:
    generating, in a first portion of a graphical user interface (GUI), a first graphical element related to reflection seismic data of an area of interest;
    generating, in a second portion of the GUI, a second graphical element related to well structural data-representing a structural orientation of the area of interest; and
    generating, in a third portion of the GUI, a third graphical element that is based on the reflection seismic data and the well structural data;
    wherein an alteration of the first graphical element or the second graphical element results in a concurrent alteration of the third graphical element.

2. The method of claim 1, wherein the first graphical element is related to a depth map that is derived from the reflection seismic data.

3. The method of claim 2, wherein the third graphical element is based on a comparison of a structural depth or orientation of the depth map and a geological layer of the well structural data.

4. The method of claim 1, wherein the well structural data is based on a resistivity measurement of a wellbore in the area of interest.

5. The method of claim 1, wherein the first portion of the GUI includes a user-interactive element to adjust a parameter related to the reflection seismic data through the application of generalization filters applied to the reflection seismic data.

6. The method of claim 1, wherein the second portion of the GUI includes a user-interactive element to adjust a parameter of the well structural data through the application of generalization filters applied to the well structural data.

7. One or more non-transitory computer-readable media comprising instructions that, upon execution of the instructions by one or more processors of an electronic device, cause the electronic device to:
    generate, in a first portion of a graphical user interface (GUI) that is to be output to a display that is communicatively coupled with the electronic device, a first graphical element related to reflection seismic data of an area of interest;
    generate, in a second portion of the GUI, a second graphical element related to well structural data representing a structural orientation of the area of interest; and
    generate, in a third portion of the GUI, a third graphical element that is based on reflection seismic data and the well structural data;
    wherein an alteration of the first graphical element or the second graphical element results in a concurrent alteration of the third graphical element.

8. The one or more non-transitory computer-readable media of claim 7, wherein the first graphical element is related to a depth map that is derived from the reflection seismic data.

9. The one or more non-transitory computer-readable media of claim 7, wherein the instructions are further to generate, in the first portion of the GUI, a user-interactive element to adjust a parameter of a depth map that is based on the reflection seismic data.

10. The one or more non-transitory computer-readable media of claim 9, wherein the parameter is a length-scale of the depth map.

11. The one or more non-transitory computer-readable media of claim 9, wherein alteration of the parameter causes the alteration of the first graphical element through the application of generalization filters applied to the reflection seismic data.

12. The one or more non-transitory computer-readable media of claim 9, wherein the user-interactive element is a slider.

13. The one or more non-transitory computer-readable media of claim 7, wherein the instructions are further to generate, in the second portion of the GUI, a user-interactive element to adjust a parameter of the well structural data through the application of generalization filters applied to the well structural data.

14. An electronic device comprising:
    one or more processors;
    a display communicatively coupled with the one or more processors; and one or more non-transitory computer-readable media comprising instructions that, upon execution of the instructions by the one or more processors, cause the electronic device to:

generate, in a first portion of a graphical user interface (GUI) that is to be output to the display, a first graphical element related to reflection seismic data of an area of interest;

generate, in a second portion of the GUI, a second graphical element related to well structural data representing a structural orientation of the area of interest; and generate, in a third portion of the GUI, a third graphical element that is based on reflection seismic data and the well structural data;

wherein an alteration of the first graphical element or the second graphical element results in a concurrent alteration of the third graphical element.

15. The electronic device of claim 14, wherein the well structural data is based on a resistivity measurement of a wellbore in the area of interest.

16. The electronic device of claim 14, wherein the instructions are further to generate, in the first portion of the GUI, a user-interactive element to adjust a parameter of a depth map that is based on the reflection seismic data.

17. The electronic device of claim 16, wherein the parameter is a length-scale of the depth map.

18. The electronic device of claim 16, wherein alteration of the parameter causes the alteration of the first graphical element.

19. The electronic device of claim 16, wherein the user-interactive element is a slider.

20. The electronic device of claim 14, wherein the instructions are further to generate, in the second portion of the GUI, a user-interactive element to adjust a parameter of the well structural data.

* * * * *

UNITED STATES PATENT AND TRADEMARK OFFICE
CERTIFICATE OF CORRECTION

| | |
|---|---|
| PATENT NO. | : 11,927,709 B2 |
| APPLICATION NO. | : 17/165248 |
| DATED | : March 12, 2024 |
| INVENTOR(S) | : Simon A. Stewart |

It is certified that error appears in the above-identified patent and that said Letters Patent is hereby corrected as shown below:

In the Claims

In Column 17, Line 56-57, Claim 1, please replace "data-representing" with -- data representing --.

Signed and Sealed this
Twelfth Day of November, 2024

*Katherine Kelly Vidal*

Katherine Kelly Vidal
*Director of the United States Patent and Trademark Office*